US009450640B2

(12) United States Patent
McCulley et al.

(10) Patent No.: US 9,450,640 B2
(45) Date of Patent: Sep. 20, 2016

(54) APPARATUS AND METHOD FOR PILOT DETECTION

(75) Inventors: Scott McCulley, Moneta, VA (US); Steven Thompson, Forest, VA (US)

(73) Assignee: Keysight Technologies Singapore (Holdings) Pte. Ltd., Singapore (SG)

( * ) Notice: Subject to any disclaimer, the term of this patent is extended or adjusted under 35 U.S.C. 154(b) by 869 days.

(21) Appl. No.: 13/176,440

(22) Filed: Jul. 5, 2011

(65) Prior Publication Data

US 2012/0008616 A1 Jan. 12, 2012

Related U.S. Application Data

(60) Provisional application No. 61/361,715, filed on Jul. 6, 2010.

(51) Int. Cl.
*H04B 7/216* (2006.01)
*H04B 1/708* (2011.01)
*H04B 1/709* (2011.01)
*H04B 1/7075* (2011.01)
*H04B 1/7107* (2011.01)

(52) U.S. Cl.
CPC ............. *H04B 1/708* (2013.01); *H04B 1/709* (2013.01); *H04B 1/70752* (2013.01); *H04B 1/70757* (2013.01); *H04B 1/71075* (2013.01); *H04B 2201/70701* (2013.01)

(58) Field of Classification Search
CPC ............. H04W 52/325; H04L 5/0048; H04L 27/2657; H04L 27/2614; H04L 1/0066
USPC ................. 370/331, 335, 342, 350; 375/152
See application file for complete search history.

(56) References Cited

U.S. PATENT DOCUMENTS

| 6,101,175 | A | * | 8/2000 | Schorman | H04W 36/0088 370/331 |
| 6,760,366 | B1 | * | 7/2004 | Wheatley, III | H04B 1/7075 370/341 |
| 7,130,332 | B1 | | 10/2006 | Shenoi | |
| 8,379,625 | B2 | * | 2/2013 | Humblet | 370/350 |
| 2003/0039228 | A1 | | 2/2003 | Shiu | |
| 2003/0043889 | A1 | * | 3/2003 | Kang | H04B 1/70758 375/147 |
| 2003/0053519 | A1 | * | 3/2003 | Gilhousen et al. | 375/141 |
| 2003/0112857 | A1 | * | 6/2003 | Cleveland | 375/152 |
| 2004/0146126 | A1 | * | 7/2004 | Wheatley, III | H04B 1/7075 375/343 |
| 2005/0007975 | A1 | * | 1/2005 | Shen | H04B 1/7103 370/320 |
| 2006/0088134 | A1 | * | 4/2006 | Gilhousen et al. | 375/345 |
| 2006/0227750 | A1 | * | 10/2006 | Soltanian | H04B 1/7075 370/335 |
| 2009/0154447 | A1 | * | 6/2009 | Humblet | 370/350 |
| 2009/0156195 | A1 | * | 6/2009 | Humblet | 455/422.1 |

OTHER PUBLICATIONS

European Search Report.
European Search Report & Written Opinion dated Sep. 28, 2011 for European Patent Application No. 11172667.5.

* cited by examiner

*Primary Examiner* — Melanie Jagannathan
*Assistant Examiner* — Najeebuddin Ansari

(57) ABSTRACT

Apparatus and method for communication are provided. The solution comprises obtaining as an input a signal; sampling the signal; feeding the sampled signal to a given number of parallel correlators having a given correlation length, controlling the correlation the sampled signal in each correlator with a unique time shift section of the pilot sequence of the communication system, determining the strongest correlation peaks, and determining on the basis of the correlation peaks and corresponding time shifts the strongest pilots in the signal.

18 Claims, 9 Drawing Sheets

APPARATUS AND METHOD FOR PILOT DETECTION

The instant application claims priority from the co-pending U.S. provisional Patent Application No. 61/361,715, entitled "Methods for fast CDMA/EVDO scanning in software defined radio", filed Jul. 6, 2010, the entirety of which is incorporated herein by reference.

FIELD

The exemplary and non-limiting embodiments of the invention relate generally to wireless communication networks. Embodiments of the invention relate especially to an apparatus and a method in wireless communication networks based on code division multiple access.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In most communication systems, several users share a common medium, such as an optical fiber or a radio path. Different multiple access methods have been developed to allow several users to simultaneously use a communication system efficiently. Frequency Division Multiple Access (FDMA), Time Division Multiple Access (TDMA), Orthogonal Frequency Division Multiple Access (OFDMA) and Code Division Multiple Access (CDMA) are four multiple access methods that are widely used in wireless systems. In FDMA, users are separated in time domain. Transmissions of the users are separated by assigning the users different frequency bands. In OFDMA, different symbols of users are transmitted in parallel using many sub frequencies, thus increasing the spectral efficiency as compared with FDMA. In TDMA, users are separated in time domain. Each user is given a time slot, during which it can transmit using the entire channel bandwidth.

In CDMA, all users simultaneously share the entire available frequency band. Each user is assigned a unique spreading code. The codes allow a receiver to separate one user from the others although their channel symbols are transmitted simultaneously in the same frequency band. The codes used are selected in such a way that the simultaneously transmitted signals are orthogonal with each other. Thus, ideally, they do not interfere with each other.

In CDMA based communication systems, it is possible to use a so-called pilot channel in the transmission direction of base to subscriber equipment, i.e. in the downlink direction. A pilot channel is a signal which is transmitted with a specific PN (pseudo noise) spreading code and utilizing the same frequency band on which the actual traffic channels are situated, the pilot signal being distinguishable from them only on the basis of the spreading code. The pilot signal is a channel known and listened to by all subscriber equipment within the cell area, and it is used for example in power measurements and in the generation of a coherent phase reference. Each base station or sector of the system transmits its own pilot signal on the basis of which the subscriber equipment can distinguish the transmissions of different base stations from each other. In CDMA all base stations may transmit using the same frequency band.

Different variants of CDMA have been proposed. For example, in systems based on Interim Standard 95 (IS-95), a pilot signal is transmitted continuously in addition to forward traffic channels. In Evolution-Data Optimized or Evolution-Data only (EVDO) based systems, a pilot signal is not transmitted continuously. In EVDO, the transmission consists of slots comprising half slots having 1024 chips. The pilot signal is transmitted in the middle of each half slot in 96 chips.

For user equipment or a device monitoring the system the fast and reliable acquisition of the pilot signal is of utmost importance as it has an effect on the operation efficiency.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later. Throughout the specification, drawings, and claims, the terms "Eb" and "Ec", and "Eb$^2$" and "Ec$^2$" are used interchangeably.

According to an aspect of the present invention, there is provided an apparatus in a code division multiple access based system for detecting pilot sequences, comprising at least one circuitry configured to cause the apparatus: obtain as an input a signal; sample the signal; feed the sampled signal to a given number of parallel correlators having a given correlation length, control the correlation the sampled signal in each correlator with a unique time shift section of the pilot sequence of the communication system, determine the strongest correlation peaks, determine on the basis of the correlation peaks and corresponding time shifts the strongest pilots in the signal.

According to another aspect of the present invention, there is provided a method in a code division multiple access based system for detecting pilot sequences, comprising: obtaining as an input a signal; sampling the signal; feeding the sampled signal to a given number of parallel correlators having a given correlation length, controlling the correlation the sampled signal in each correlator with a unique time shift section of the pilot sequence of the communication system, determining the strongest correlation peaks, determining on the basis of the correlation peaks and corresponding time shifts the strongest pilots in the signal.

LIST OF DRAWINGS

Embodiments of the present invention are described below, by way of example only, with reference to the accompanying drawings, in which FIG. 1 illustrates an example of a communication environment;

DESCRIPTION OF SOME EMBODIMENTS

Embodiments are applicable to user equipment (UE), server, corresponding component, a measuring device, a monitoring device and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are Interim Standard 95 (IS-95), CDMA2000 and Evolution-Data Optimized or Evolution-Data only (EV-DO), which all are based on code division multiple access.

Figure 1:
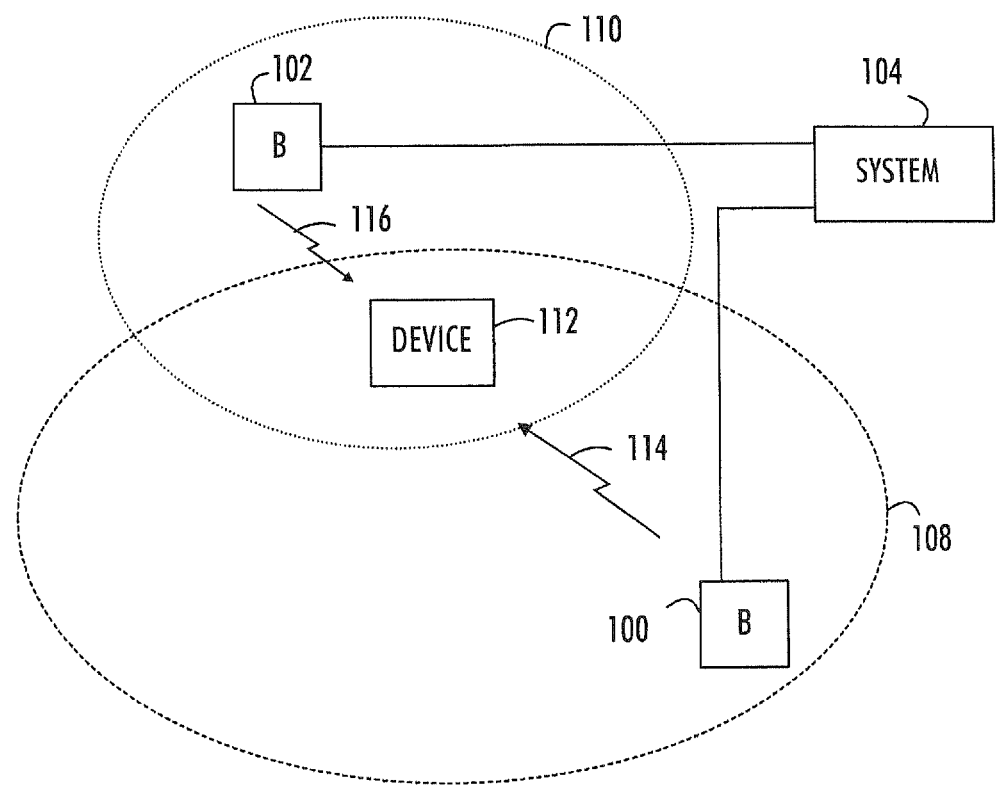

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

FIG. 1 shows two base stations 100, 102 of a communication system 104. The base stations have coverage areas 108, 110 where the transmissions of the base stations are well received. FIG. 1 shows an apparatus 112 configured to receive the transmissions of the base stations. In this particular example, the apparatus 112 is so situated that it may receive the transmission 114 from base station 100 and the transmission 116 from base station 102: It should be noted that embodiments of the invention are not limited to any particular number of base stations. All base stations may transmit using the same frequency band.

The apparatus may be user equipment, mobile station, a fixed station, a portable or fixed communication apparatus, a measurement or analyzing device, a scanner or any other kind of device configured to receive transmissions from a base station of a communication system. The apparatus may be a standalone device or it may be connectable to other devices such as personal computers, analyzers or other devices.

The base stations or sectors of the system 104 are configured to transmit a pilot signal on the basis of which a receiving apparatus can distinguish the transmissions of different base stations from each other. A base station may transmit more than one pilot signal.

Typically in CDMA based systems such as IS-95, the pilot signal transmitted by base stations utilize a single continuous pilot sequence having a length of 32768 chips. Different pilot signals are realized using time shifts of the pilot sequence. For example, IS-95 defines 512 different pilot signals as time shifts of a given pilot sequence. The adjacent pilot signals are shifted by 64 chips from each other.

The chip rate of CDMA is 1.2288 MHz so the pilot sequence repeats every 26.667 ms. In one second 37.5 repeats have occur and in two seconds 75 repeats have occurred. All base stations of the system are synchronized with each other for example with Global Positioning System (GPS) time so the beginning of each sequence is transmitted relative to the even second of GPS.

Figure 2:
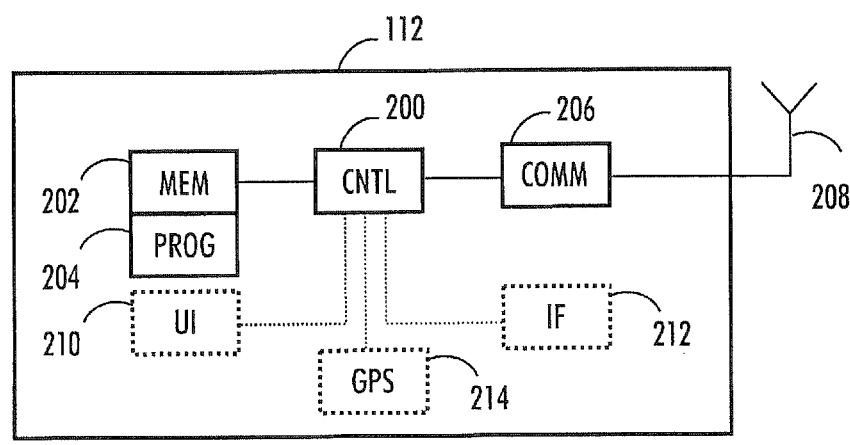
FIG. 2 illustrates an example of an apparatus.

FIG. 2 illustrates an embodiment. The figure illustrates a simplified example of an apparatus 112 applying embodiments of the invention. In some embodiments, the apparatus may be user equipment of a communications system or a measuring device or an analyzer. The apparatus may also be interpreted as a circuitry implementing the required functionality within user equipment of a communications system or a measuring device or an analyzer.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 200 configured to control at least part of the operation of the apparatus. The control circuitry 200 may comprise one or more processors or circuits, digital signal processors or Field-programmable Gate Arrays (FPGA).

The apparatus may comprise a memory 202 for storing data. Furthermore the memory may store software 204 executable by the control circuitry 200. The memory may be integrated in the control circuitry.

The apparatus comprises a communications unit 206. The communications unit is operationally connected to the control circuitry 200. It may be connected to an antenna arrangement 208. The communications unit 206 may be a transceiver or a receiver.

The software 204 may comprise a computer program comprising program code means adapted to cause the control circuitry 200 of the apparatus to control the communication unit of the apparatus.

The apparatus may further comprise interface circuitry 212 configured to connect the apparatus to other devices such as personal computers or another measurement devices or network elements of the communication system.

The apparatus may further comprise user interface 210 operationally connected to the control circuitry 200. The user interface may comprise a display, a keyboard or keypad, a microphone and a speaker, for example. Furthermore, the apparatus may comprise a Global Positioning System (GPS) unit 214 configured to determine the location of the device and receive timing information from the GPS. In an embodiment, the apparatus may receive timing information of the communication system also from the base stations.

Figure 3:
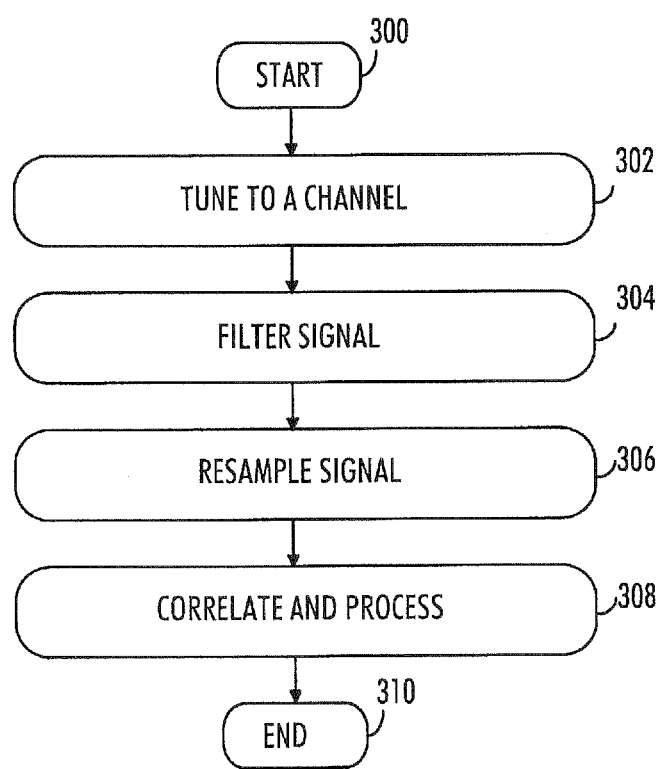
FIG. 3 is a flowchart illustrating an embodiment of the invention.

Referring to the flowchart of FIG. 3 let bus study an embodiment. The process starts at 300. In step 302, the communication unit 206 of the apparatus 112 is configured to tune to a specified channel in the frequency band of interest.

In step 304, the unit 206 is configured to filter the signal to the CDMA bandwidth (nominal 1.2288 MHz).

In an embodiment, the communication unit is configured to resample the signal to 2× chip rate baseband I and Q (complex) samples in step 306. The samples may be forwarded to the control circuitry 200 for further processing.

In step 308, the 2× chip rate baseband I and Q samples are collected and processed by an FPGA or a DSP microprocessor which is configured to perform correlation and processing which is described below. In an embodiment, the processing results include detected pilot(s), the ratio Ec/Io of received pilot energy Ec to total received energy or the total power spectral density Io and values for Ec and Io. The process ends in step 310.

In an embodiment, the correlation process is realized by feeding the sampled signal to a given number of parallel correlators having a predetermined correlation length, correlating the sampled signal in each correlator with a pilot sequence having a unique time shift of the pilot sequence, determining the strongest correlation peaks and determining on the basis of the correlation peaks and corresponding time shifts the strongest pilots in the received signal.

Let us assume that the predetermined correlation length is 512 chips. In general, non-limiting examples of suitable correlation lengths are 512, 1024, 2048, or 4096 chips. The pilot signal transmitted by CDMA base stations utilizes a single continuous pilot sequence having a length of 32768 chips. Each correlator in the bank of parallel correlators operates over a specified time interval of the 32768 chip sequence. Hence, the sequences may be referred to as time-shifted sequences.

A sample set has correlation length samples and adjacent sets are shifted by one sample. If correlation length is 1024, then $1^{st}$ sample set is 0 to 1023, $2^{nd}$ sample set is 1 to 1024. It should be noted that the indexing of both samples and PN starts from zero.

If the number of adjacent sample sets to process in each correlator is 512 there will need to be 32768/512 or 64 correlators for odd samples and 64 for even samples running at 1× chip rate. The outputs of each of the 64 even and 64 odd sets of correlators are peak detected to provide a given set of peaks with their associated Ec, Io, and Ec/Io values. The outputs of all 128 correlators are then further processed to provide a final set of result values.

Prior art pilot scanners are configured to collect 32768 chips and calculate correlations using the same 32768 chip sequence of the size of correlation length to determine all 512 possible pilots. The collection time for 32768 chips at the CDMA chip rate of 1.2288 MHz is 26-⅔msec. When added to processing and reporting times this becomes a significant factor and limits overall processing speed of a pilot scanner.

In the proposed solution the entire unique PN sequence of 32768 chips is accounted for when a small duration of chips is collected by time shifts of the reference CDMA PN (pseudo noise) sequence.

For example, only 512 chips plus correlation length at 1× rate is needed to detect all the pilots. In order to accomplish this 32768/512 correlators with correlation length are run with 32768/512 different PN sequences to make up the entire repeating CDMA PN short code sequence. It may be referred as time shifts as above but it may also be looked at as indexing into the reference PN sequence.

For a correlation length of 512 64 correlators are run in parallel over 512 chips. At a 2× chip rate 128 correlators are required and so forth. A higher chip rate provides improved timing accuracy and accuracy of the computed Ec/Io values.

In the above example the collect time of the proposed solution is 1/64 of the prior art methods. Let us study another simple example in a CDMA system. As mentioned, there are 512 possible pilots in a CDMA system. The pilots may be numbered from 0 to 511 and denoted with PN 0, PN 1, etc. Assume that a base station or base stations are transmitting pilots PN 0, 128, 256, and 384 of the possible 512 pilots. As mentioned above, the base stations are synchronized with each other using GSP, for example. The beginning of each pilot is transmitted relative to the even second of GPS. In this case, the first 512 chips received on the even 2 second would be chips 0 to 511 of the 32768 chip long sequence or chip(0:511) for PN0, chip(24576:25087) for PN 128, chip (16384:16895) for PN 256, and chip(8192:8703) for PN 384.

By running 4 parallel correlators with these chips, the needed collection time may be cut by ¼ to ensure that all 32768 chips are tested. The different chips sets of the correlators are evenly spaced and represent a time shift. So the absolute PN detected would be computed by noting the GPS time reference of the received data and determining which relative chip sequence was detected at what time. The receiver performing the correlations is aware of the time relative to even second of GPS when the data is collected. Thus, the index into the data at which the correlation occurs provides the time delay which gets added to the even GPS time so that absolute time can be computed.

In the above example, the required data to be collected is 32768/4 or 8192 chips plus the desired correlation length. If the correlation length is 512 then the required number of samples at 1× chip rate would be 8703, but only 8192 correlations would occur: $1^{st}$ using samples 0 to 511, $2^{nd}$: using samples 1 to 512, etc. until $8192^{nd}$ using samples 8191 to 8702.

Thus, if correlation length is L, the number of correlators N, and S is number of samples at single chip rate the following applies S=32768/N+L.

If sampling is done at 2× chip rate (2.4576e6), the actual number of samples will be 2×S. However, the collection time required of sampling is the same because S/1.2288e6= (2*S)/(2.4576e6). In an embodiment, the solution utilizes two duplicate paths with one have the even samples (0, 2, 4, etc.) and the other having the odd (1, 3, 5, etc.). The purpose behind the even and odd is that the sample clock may not be aligned with the chip clock. In such cases a 2× of chip rate will allow the system to be at most ¼ from the perfect time alignment. A 4× of chip rate would have worst case time offset of ⅛ from perfect time alignment.

A border condition exists when last 512 samples at one time shift are compared to the first 512 samples of the preceding time. Therefore data may be normalized with received power. It is advantageous to use $Eb^2/Io^2$ (or Eb/Io) is for peak detection with the proposed time split technique because if only $Eb^2$ were used then the border condition could produce wrong peaks. When correlation results are close to the ideal location several adjacent samples will have strong values. For example, in the middle of a collection the power from sample 100 to 611 compared to sample 101 to 612 and to sample 99 to 610 will be about the same. In this case taking the strongest $Eb^2$ between these three sets would be safe as the $Io^2$ would be about the same. However, if the true peak is at sample 0 then the Io for sample 0 to 511 might be very different compared to samples 511 to 1023. Also the fact that the PN sequence will be different at border can also change the $Eb^2$ value. Therefore the use of normalized power is increases the accuracy of the correlation process.

In CDMA systems, pilot signals are transmitted continuously. EVDO systems utilize the same 32768 chip pilot sequence as CDMA but the pilot is not transmitted continuously. As EVDO utilizes a combination of CDMA and TDMA, it uses a slotted frame structure where pilot is only transmitted in 96 chips in the middle of a 1024 chip half-slot. Thus first 464 samples from the beginning of a half-slot are skipped and the next 96 are correlated. Then the next 928 (1024–96) are skipped and the next 96 are correlated again. This pilot structure pattern causes the pilots PN 0 and PN 16 to use the same chips (and respectively PN 1 and PN 17, etc.) as pilot signal: thus, there are only 32 different chip sets as pilot signals but the time relative to the GPS even second determines which PN is in question.

The above formula for correlation length (L), number of correlators (N), and number of samples (S) applies also to EVDO except that correlation length (L) is actually the collection correlation length for the need half slot. In EVDO, the correlation length is given by the number of half slots. So a designer would select how many half slots to correlate over. The more half slots the longer collection time is required but also the better correlation result obtained. Thus, L=1024*H where H is the number of half slots desired.

The number of chips in which correlation will occur is 96*H so 4 slots or 8 half slots is 768 chips. So simplified EVDO collection time in chips would be 32768/N+1024*H.

The number of correlators N is actually correlator sets because of the PN shift property of EVDO (only 96 of 1024 chips used). Because the first 464 samples can be taken as a time shift, the minimum number of samples is 32768/N+96+1024*(H−1) where H is number of half slots processed.

In most systems data is usually collected in chucks of $2^n$ so if the system collects 128 samples at a time then the +96 above would actually be +128.

Figure 4:
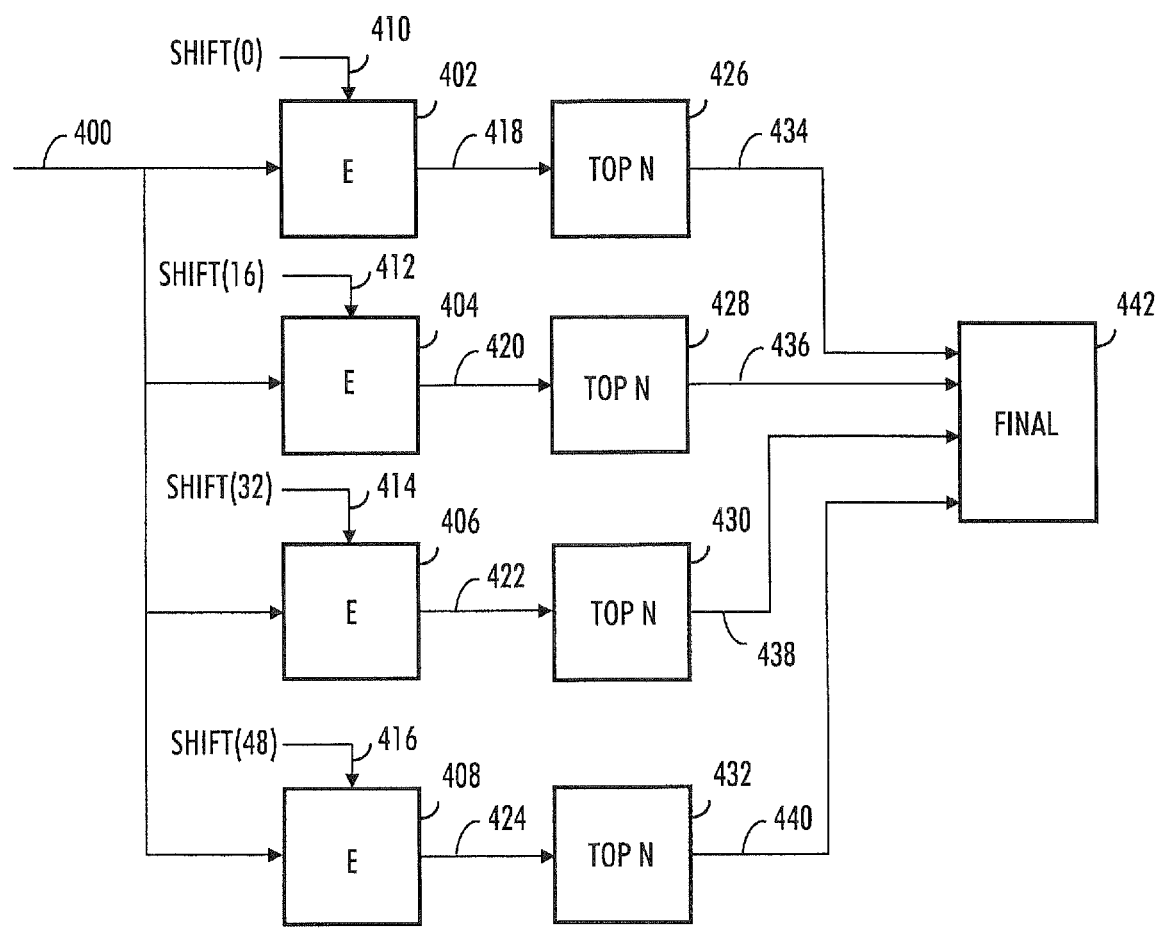
FIGS. 4, 5 and 6 illustrate examples of arrangements for determining strongest pilots in a CDMA system.

Let us study the realization of the correlation process further. FIG. 4 illustrates an example of an arrangement for determining the strongest pilots in a received CDMA signal. The arrangement may be implemented in control circuitry 200 of the apparatus of FIG. 2. The control circuitry 200 may comprise one or more processors or circuits, digital signal processors or Field-programmable Gate Arrays (FPGA).

As an input, the arrangement comprises sampled signal 400. The samples are taken to four parallel summing blocks 402, 404, 406 and 408. Each parallel summing block has also as an input of a time shift of the pilot PN sequence 410, 412, 414 and 416 of the communication system, the total length of the sequence being 32768 chips. Each summing block operates on a different time shift of the sequence so that the whole sequence will be correlated. The summing blocks correlate the samples with the time shifted sequences and produce a given number of best correlation results 418, 420, 422 and 424 than are taken to a Top N units 426, 428, 430 and 432 where the strongest pilots with sample index are adjusted backwards by 512 chips of 8 PN pilots due to time shifting of the PN sequence. The backward adjusting may be realized as a subtract negative with modulo 512 (range is 0 to 511). SHIFT(16) is 16*512 chips which is 8192 chips or 128 PNs. The final result will be a list to top PNs (0 to 511) each having a relative sample index from the beginning of the PN. If the sample index is at the 1× chip rate then the sample index will have a range of 0 to 63 because there are 64 chips in one PN.

The adjusted results 434, 436, 438, 440 are taken to selector 442 configured to select the strongest pilots from the adjusted pilots.

Figure 5:
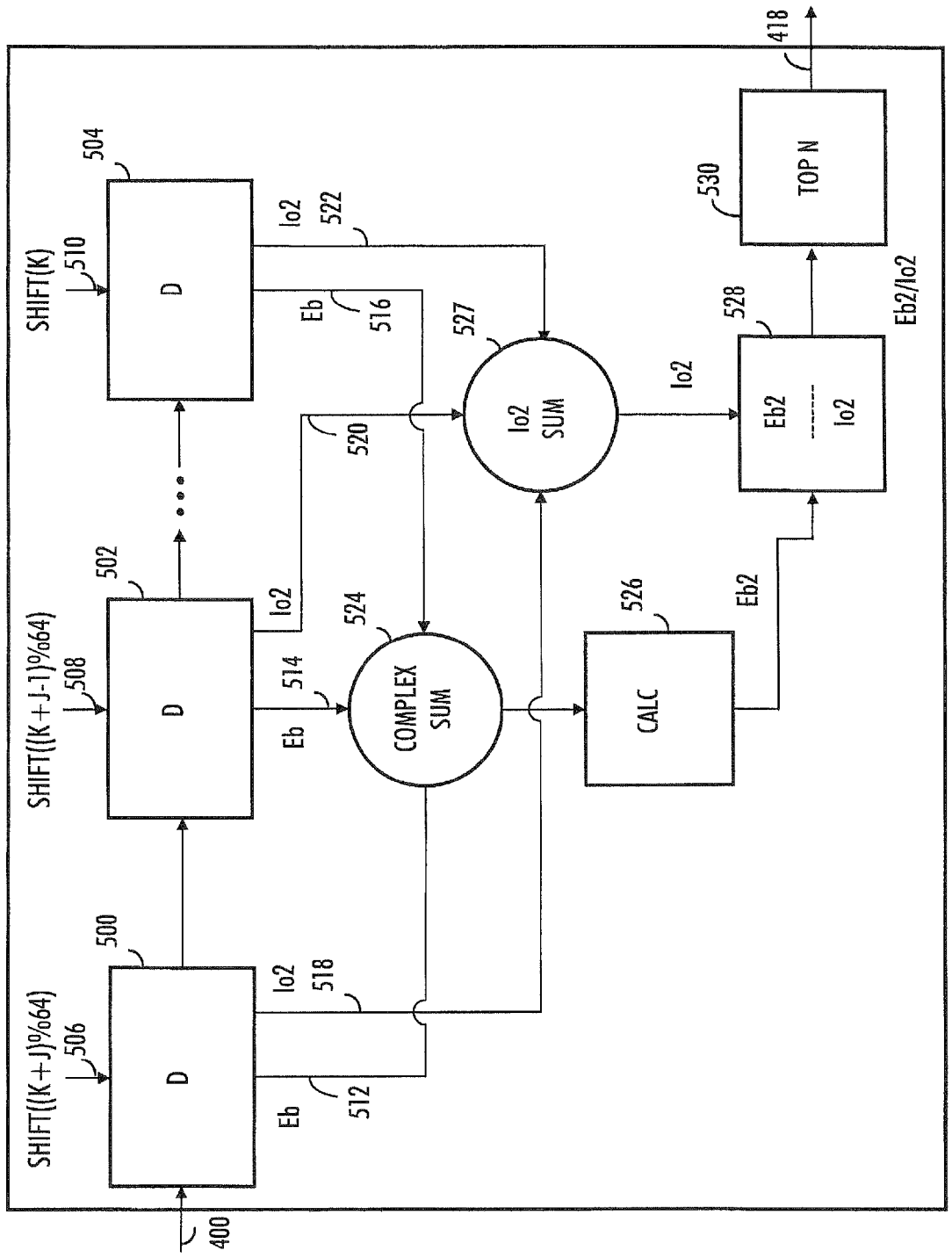

FIG. 5 illustrates an example of a summing block 402. The other summing blocks 404, 406, 408 are similar. The summing block has as an input the sampled signal 400. The block comprises a set of correlator blocks 500, 502, 504 daisy chained together to obtain longer correlation lengths. Each correlator block has as another input a time shifted PN sequence 506, 508, 510. In this example, the first correlator block 500 has the input 506 Shift ((k+j)%64), where j equals the number of 512 correlations to use (i.e. the number of correlator blocks), k equals the beginning of the correlation and % denotes modulo operation. Correspondingly, the second correlator block 502 has the input 508 Shift ((k+j−1)%64) and the last correlator block 504 has the input 510 Shift ((k)%64).

As an output each correlator block 500, 502, 504 has computed values for received pilot energy Eb 512, 514, 516 and total received energy or squared total power spectral density $Io^2$ 518, 520, 522. These values are combined in adder 524, 527 obtaining complex sums of Eb and $Io^2$. The complex sums of Eb are taken from the adder 524 to calculator 526 where $Eb^2$ is calculated as $I^2+Q^2$. The ratio $Ec^2/Io^2$ is calculated in calculator 528 and taken to selector 530 which selects and outputs 418 a given number of strongest pilots along with their sample indexes on the basis of the ratios $Ec^2/Io^2$. In an embodiment, the ratio of received pilot energy to total received energy is determined in the correlators and this ratio is compared to a given threshold. The use of selector 530 is optional as the selection may be performed in full also in the selector 442 of FIG. 4.

Figure 6:
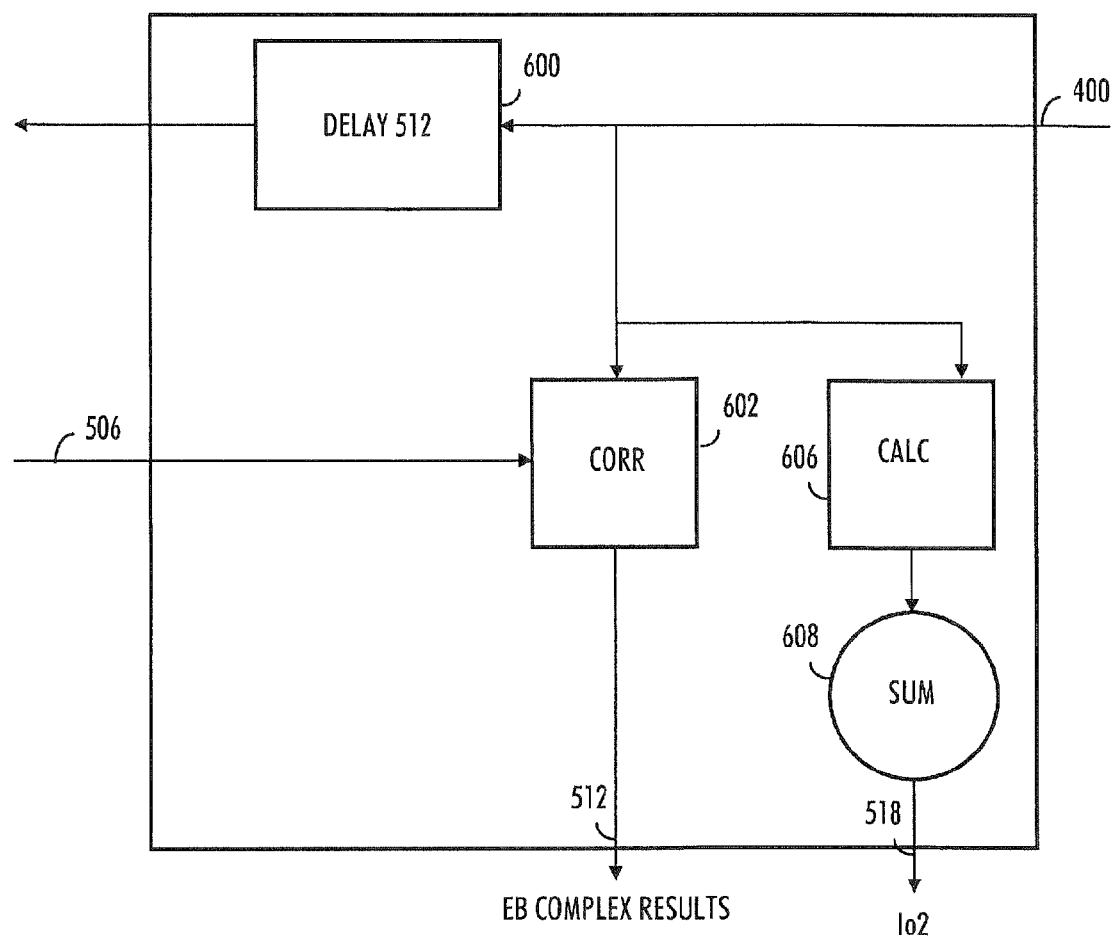

FIG. 6 illustrates an example of a correlator block 500. The other correlator blocks 502, 504 are similar. The correlator block has as an input the sampled signal 400. The samples are taken via a delay unit 600 of 512 chips and serve as the input of the next correlator block in series when the correlation length to greater than 512. The samples 400 are also taken to a correlator 602 where the samples are correlated with time shifted PN sequence 506. In this example, the correlator 602 is a 512 tap correlator. The number of taps may be a given multiple of 512. The 512 tap correlator performs 512 complex multiples using 512 input samples (from 600) and the 512 PN sequences from 506. The result of each multiple is complex summed together. The output of the correlator gives one Eb complex value 512 for each input sample.

The samples 400 are also taken to a 512 tap calculator 606 calculating squared power $I^2+Q^2$ which are summed in adder 608. The output 518 of the adder 608 is $Io^2$.

Figure 7:
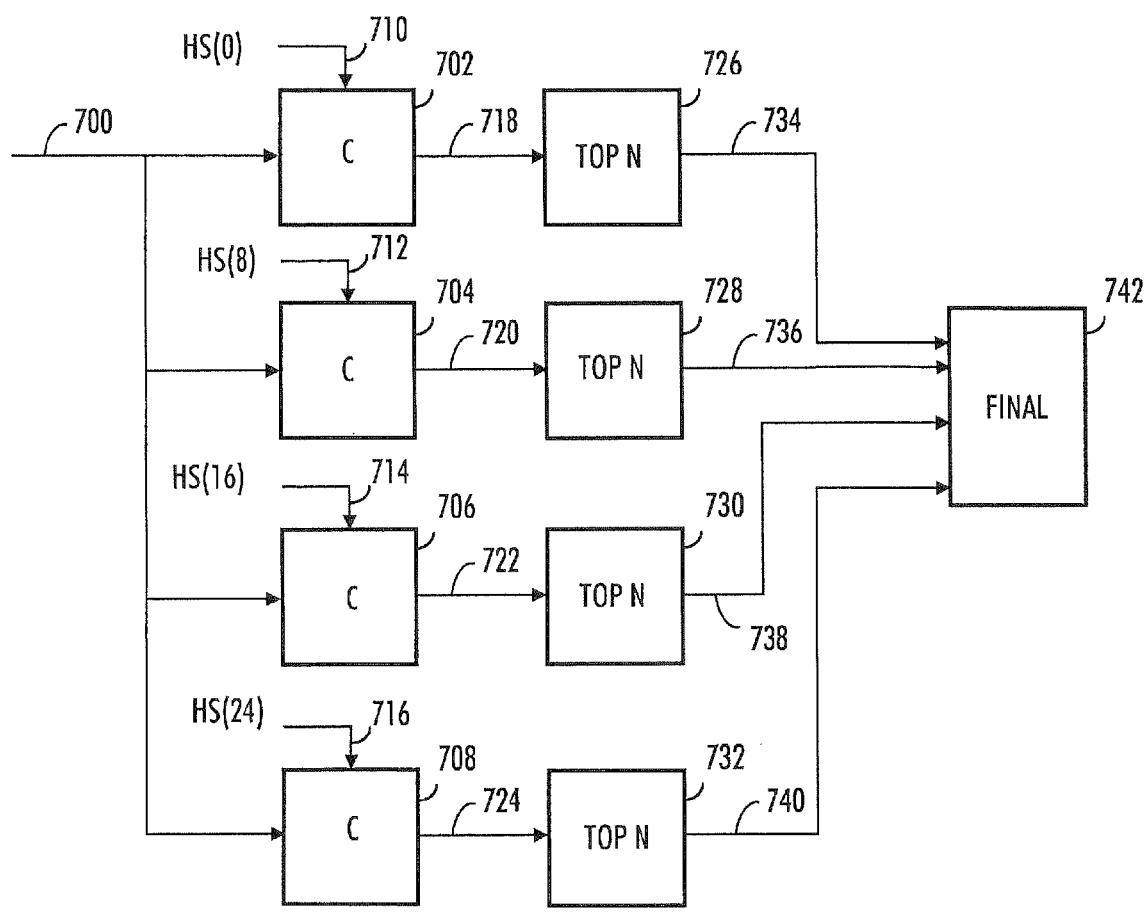
FIGS. 7, 8 and 9 illustrate examples of arrangements for determining strongest pilots in an EVDO system.

Let us study another example of the realization of the correlation process. FIG. 7 illustrates an example of an arrangement for determining the strongest pilots in a received EVDO signal. The arrangement may be implemented in control circuitry 200 of the apparatus of FIG. 2. The control circuitry 200 may comprise one or more processors or circuits, digital signal processors or Field-programmable Gate Arrays (FPGA).

The arrangement is configured to process the half-slots of an EVDO signal, where each half-slot comprises 96 pilot chips in the middle of the slot as described above.

As an input, the arrangement comprises sampled signal 700. The samples are taken to four parallel summing blocks 702, 704, 706 and 708. As up to 32 half slots exists, the fastest implementation would be to have all 32 HS implemented but this example only four are implemented. Each parallel summing block has also as an input of a time shifts of the pilot PN sequence 710, 712, 714 and 716 of the communication system, the total length of the sequence being 32768 chips. Each summing block operates on a different time shift of the sequence so that the whole sequence will be correlated. The time shifts are set to be evenly spaced so all sequences are detected with a reduced collection time. Collection time is in this example 1 Frame divided by 4 plus the correlation length. The correlation length depends on the number of half slots to be processed. Each half slot is 1024 chips. So if two slots correlation is needed then collect time would be 32768/4+1024*4=12288 chips.

The summing blocks correlate the samples with the time shifted sequences and produce a given number of best correlation results ($Eb^2/Io^2$, PN offset, sample time) 718, 720, 722 and 724 than are taken to Top N units 726, 728, 730 and 732 where the detected pilots are adjusted backwards due to time shifting of the PN sequence and the strongest N are reported.

The adjusted results 734, 736, 738, 740 are taken to selector 742 configured to select the strongest pilots from the adjusted pilots.

Figure 8:
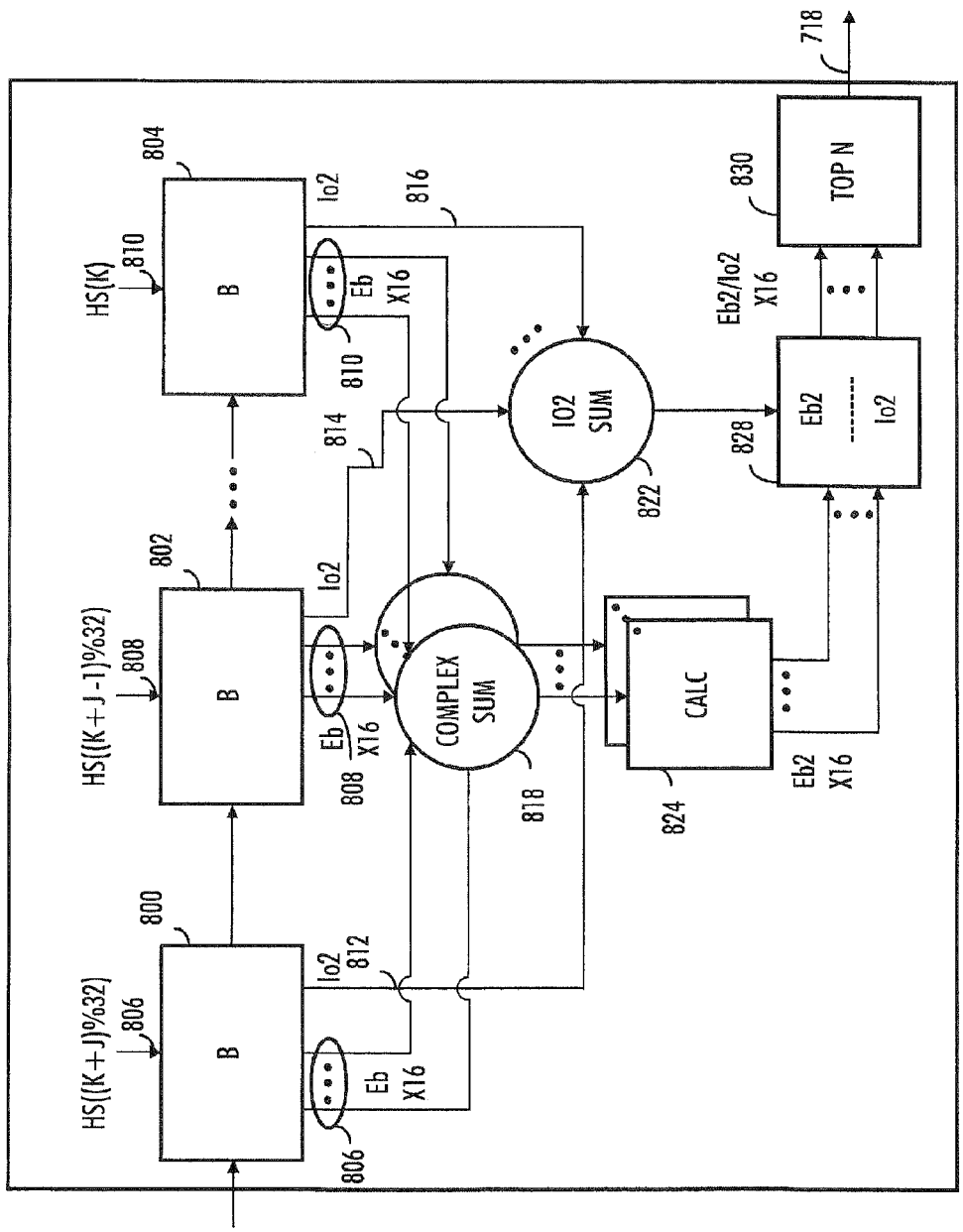

FIG. 8 illustrates an example of a summing block 702. The other summing blocks 704, 706, 708 are similar. The summing block has as an input the sampled signal 700. The block comprises a set of correlator blocks 800, 802, 804 daisy chained together to obtain longer correlation lengths. Each correlator block has as another input a time shifted PN sequence 806, 808, 810. In this example, the first correlator block 800 has the input 806 Shift ((k+j)%32), where j equals the number of half slots to combine (i.e. the number of correlator blocks), k equals the first half slot to combine and % denotes modulo operation. Correspondingly, the second correlator block 802 has the input 808 Shift ((k+j−1)%32) and the last correlator block 804 has the input 810 Shift ((k)%32).

The complex results 806, 808, 810 of each PN offset are combined in adders 818, 820 for each half slot to give a combined Eb for the half slots. Each correlator block has 16 values as its Eb output as explained below. Likewise the total received energy or squared total power spectral density $Io^2$ values 812, 814, 816 are combined in adder 822. The complex sums of Eb are taken from the adders 818, 820 to a set of calculators 824 where $Eb^2$ is calculated as $I^2+Q^2$. The ratio $Ec^2/Io^2$ is calculated in calculator 828 and taken to selector 830 which selects and outputs 718 a given number of strongest pilots on the basis of the ratios $Ec^2/Io^2$. In an embodiment, the ratio of received pilot energy to total received energy is determined in the correlators and this ratio is compared to a given threshold. The PN offset and sample index are included with the results. The use of selector 830 is optional as the selection may be performed in full also in the selector 742 of FIG. 7.

Figure 9:
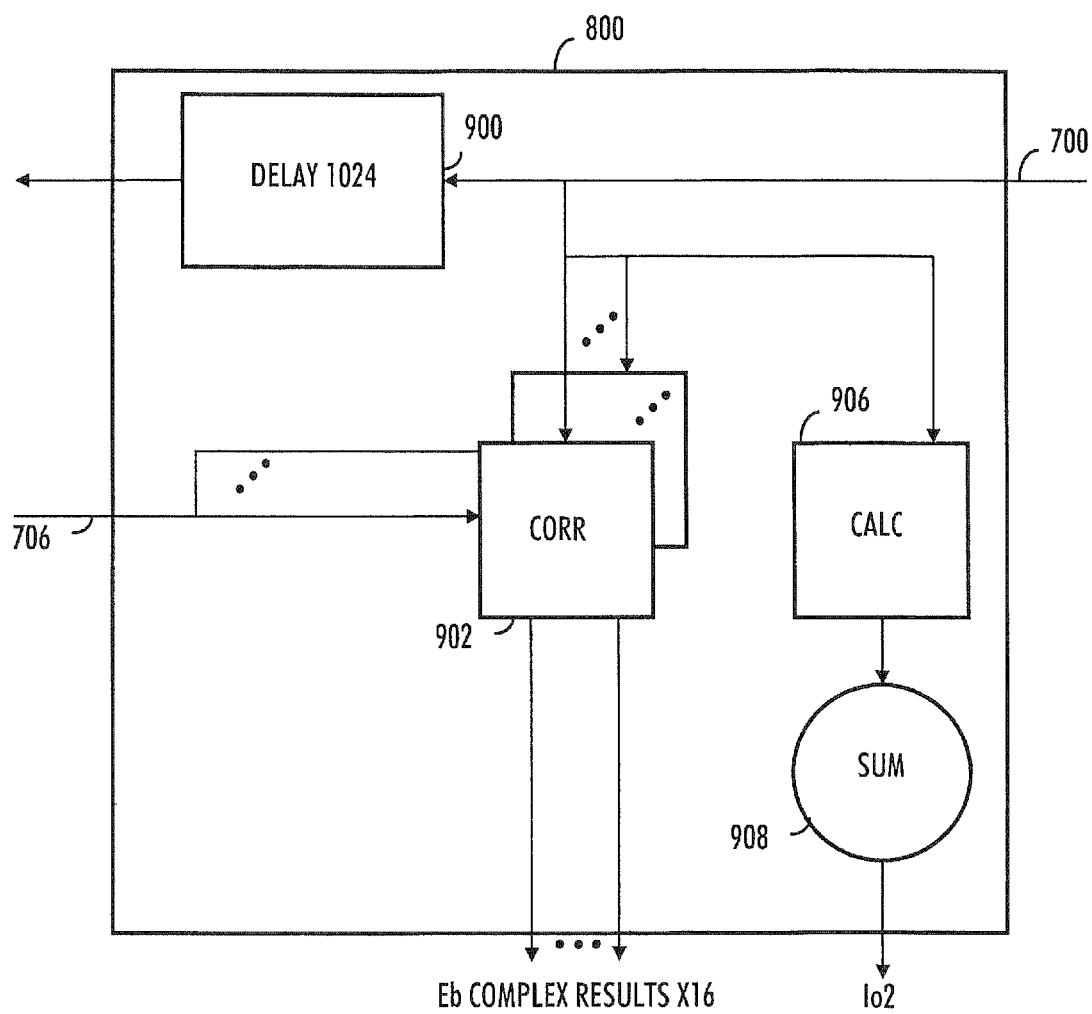

FIG. 9 illustrates an example of a correlator block 800. The other correlator blocks 802, 804 are similar. The correlator block has as an input the sampled signal 700. The samples, only the first 96, are taken via a delay unit 900 of 1024 chips to the input of the next correlator block in series. The samples 700 are also taken to a set of correlators 902 where the samples are correlated with 16 PN offsets (n) at time shift k 706. In this example there are 16 96 tap correlators in the set of correlators. Each tap set represents a different PN Offset. Each 16 complex Eb values 806 are passed to the next block for more processing.

The samples 700 are also taken to a tap calculator 906 calculating squared power $I^2+Q^2$ which are summed in adder 908. The output 812 of the adder 908 is $Io^2$.

Figure 10:
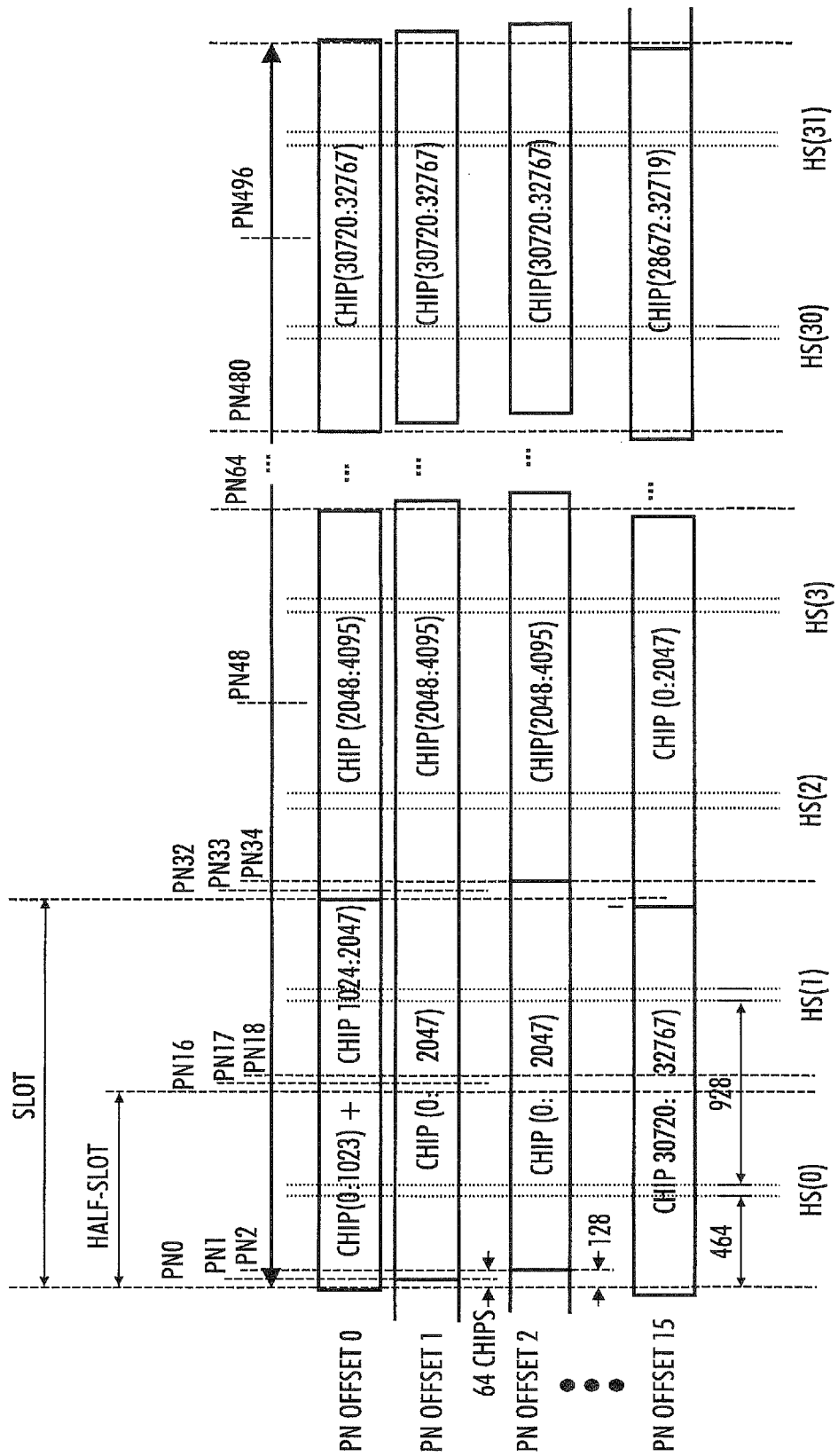
FIG. 10 illustrate PN Offsets.

Let us study the PN offsets used in the EVDO correlation process more closely with FIG. 10. An EVDO frame comprises 16 time slots. Each slot comprises 2048 chips and half-slot 1024 chips and the pilot is the middle 96 chips of a half-slot. In an embodiment, PN Offsets and HS sequences of length 96 chips are used in the correlation of the samples in order to obtain strongest PN relative to the sample clock. One frame contains 512 PNs, so each PN offset can detect one of 32 unique PNs (512/16). With 32 different HS sets all unique PNs may be detected.

The PN offset, n, has a range of 0 to 15 and is 16 different taps. The time shift k is half slot used. The table below gives different offsets, which are visualized in FIG. 10. FIG. 10 illustrates the PN Offsets applied to an EVDO frame comprising 32768 chips, 512 PNs and 16 time slots (2048 chips) and thus 32 half-slots (1024 chips). In this example, the frame starts at an even second of time reference (GPS time). In the middle of each half-slot a pilot signal is transmitted using 96 chips. Pilots are denoted in FIG. 10 with HS(n) where n is the number of half-slot. FIG. 10 illustrates the first two and the last time slot of a frame. In addition PN Offsets 0, 1 2 and 15 are partially disclosed.

| PNs (k = 0 . . . 31) | 96 taps used in Half Slot Correlators |
|---|---|
| 000 + 16*k | chip(464 + k*1024 to 559 + k*1024) |
| 001 + 16*k | chip(400 + k*1024 to 495 + k*1024) |
| 002 + 16*k | chip(336 + k*1024 to 431 + k*1024) |
| 003 + 16*k | chip(272 + k*1024 to 367 + k*1024) |
| 004 + 16*k | chip(208 + k*1024 to 303 + k*1024) |
| 005 + 16*k | chip(144 + k*1024 to 239 + k*1024) |
| 006 + 16*k | chip(80 + k*1024 to 175 + k*1024) |
| 007 + 16*k | chip(16 + k*1024 to 111 + k*1024) |
| 008 + 16*k | k = 0, chip(32720 to 32767 and 0 to 47) |
| | k > 0, chip(−48 + k*1024 to 47 + k*1024) |
| 009 + 16*k | k = 0, chip(32656 to 32751) |
| | k > 0, chip(−112 + k*1024 to −17 + k*1024) |
| 010 + 16*k | k = 0, chip(32592 to 32687) |
| | k > 0, chip(−176 + k*1024 to −81 + k*1024) |
| 011 + 16*k | k = 0, chip(32592 to 32623) |
| | k > 0, chip(−240 + k*1024 to −145 + k*1024) |
| 012 + 16*k | k = 0, chip(32528 to 32687) |
| | k > 0, chip(−304 + k*1024 to −209 + k*1024) |
| 013 + 16*k | k = 0, chip(32592 to 32687) |
| | k > 0, chip(−368 + k*1024 to −273 + k*1024) |
| 014 + 16*k | k = 0, chip(32592 to 32687) |
| | k > 0, chip(−432 + k*1024 to −337 + k*1024) |
| 015 + 16*k | k = 0, chip(32592 to 32687) |
| | k > 0, chip(−496 + k*1024 to −401 + k*1024) |

The above can be reduced to one formula:

PN(n+16*k) will use the 96 taps in chips [(464−n*64+32,678) % 32,678) to (559−n*64+32,678) % 32,678), where n is the PN Offset.

When the system is running at 2× sample rate or higher the system would need to have a path for each rate. So for 2× sample rate an even sample path and odd sample path are used. This allows for timing adjustments since the data clock and sample clock are not necessarily time aligned.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), field-programmable gate arrays, software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invented claimed is:

1. An apparatus in a code division multiple access based system for detecting pilot sequences, comprising:
    a receiver for receiving a signal;
    a sampling circuit to sample the received signal;
    a plurality of parallel correlators each having a given correlation length, wherein the sampled signal is input into the parallel correlators; and
    a controller, wherein the controller:
    controls the correlation of the sampled signal in each correlator with a unique time shift section of a pilot sequence of the communication system,
    determines the strongest correlation peaks,
    determines on the basis of the correlation peaks and corresponding time shifts the strongest pilots in the signal,
    determines in the correlators ratios of received pilot energy to total received energy,
    compares a first and a second of the determined ratios, and
    determine, on the basis of the comparison of the determined ratios, a correlation result including a timing from the time shift of the pilot sequence and the time reference of the communication system, wherein the apparatus is configured to feed the sampled signal to N parallel correlators having a correlation length of L, wherein the number of samples required equals A*B where A=32768/N+L and B=the chip rate.

2. The apparatus of claim 1, wherein the correlation length L is a multiple of 512.

3. The apparatus of claim 1, wherein the controller performs correlation separately for I and Q-branches of the received signal.

4. The apparatus of claim 1, wherein an output of the sampling circuit is input to N parallel correlators having a correlation length of L, wherein the number of samples required equals A+B+C−D where A=32768/N, B=96, C=1024*H, and D=1024, where H is number of half slots processed.

5. The apparatus of claim 4, wherein said plurality of parallel correlators skips a first 464 samples from the beginning of a half-slot, calculates correlation with the next 96 samples, skips the next 928 samples, calculates correlation with the next 96 samples, and repeats the procedure until a given number of half-slots are processed.

6. The apparatus of claim 4, wherein sections of the pilot sequence used in the correlation process as PN Offsets $PN_j$ having a range of 0 to 15 where $PN_j$ will use the 96 taps in chips Y % 32,678 to Z % 32,678, where j=n+16*k, Y=464−n*64+32,678, Z=559−n*64+32,678, n is the PN Offset and k half-slot used, and % denotes modulo operation.

7. The apparatus of claim 1, wherein said controller further correlates sections of sampled signal in parallel utilizing the ratio of received pilot energy to total received energy or ratio of squared received pilot energy to squared total received energy for peak detection; and
    combines detection results to obtain a continuous detection pattern.

8. The apparatus of claim 1, wherein the strongest correlation peaks determined by the controller equals a predetermined number of correlation peaks.

9. A method in a code division multiple access based system for detecting pilot sequences, comprising:
    obtaining as an input a signal;
    sampling the signal;
    feeding the sampled signal to a plurality of parallel correlators each having a given correlation length;
    controlling the correlation of the sampled signal in each correlator with a unique time shift section of the pilot sequence of the communication system;
    determining the strongest correlation peaks;
    determining on the basis of the correlation peaks and corresponding time shifts the strongest pilots in the signal,
    determining in the correlators ratios of received pilot energy to total received energy;
    comparing a first and a second of the determined ratios;
    determining, on the basis of the comparison of the determined ratios, a correlation result including a timing from the time shift of the pilot sequence and the time reference of the communication system; and feeding the sampled signal to N parallel correlators having a correlation length of L, wherein the number of samples required equals A*B where A=32768/N+L and B=the chip rate.

10. The method of claim 9, wherein the correlation length L is a multiple of 512.

11. The method of claim 9, further comprising:
controlling the correlator to perform correlation separately for I and Q-branches of the received signal.

12. The method of claim 9, further comprising:
feeding the sampled signal to N parallel correlators having a correlation length of L, wherein the number of samples required equals A+B+C−D where A=32768/N, B=96. C=1024*H, and D=1024, where H is number of half slots processed.

13. The method of claim 12, further comprising: when performing correlation, skipping a first 464samples from the beginning of a half-slot, calculating correlation with the next 96 samples skipping the next 928samples, calculating correlation with the next 96 samples, and repeating the procedure until a given number of half-slots are processed.

14. The method of claim 12, further comprising: selecting the sections of the pilot sequence used in the correlation process as PN Offsets $PN_j$ having a range of 0 to 15 where $PN_j$ will use the 96 taps in chips Y % 32,678 to Z %32,678 where j =n+16*k, Y =464−n*64+32,678. Z =559−n*64+32, 678, n is the PN Offset and k half-slot used, and % denotes modulo operation.

15. The method of claim 9, further comprising: correlating sections of sampled signal in parallel utilizing the ratio of received pilot energy to total received energy or ratio of squared received pilot energy to squared total received energy for peak detection;
and combining detection result to obtain a continuous detection pattern.

16. The method of claim 9, wherein the step of determining the strongest correlation peaks includes determining a predetermined number of strongest correlation peaks.

17. A computer program product embodied on a non-transitory distribution medium readable by a computer and comprising program instructions which, when loaded into an apparatus, execute a computer process comprising:
obtaining as an input a signal;
sampling the signal;
feeding the sampled signal to a plurality of parallel correlators each having a given correlation length;
controlling the correlation the sampled signal in each correlator with a unique time shift section of the pilot sequence of the communication system;
determining the strongest correlation peaks;
determining on the basis of the correlation peaks and corresponding time shifts the strongest pilots in the signal,
determining in the correlators ratios of received pilot energy to total received energy;
comparing a first and a second of the determined ratios;
determining, on the basis of the comparison of the determined ratios, a correlation result including a timing from the time shift of the pilot sequence and the time reference of the communication system; and
feeding the sampled signal to N parallel correlators having a correlation length of L, wherein the number of samples required equals A*B where A=32768/N+L and B=the chip rate.

18. The computer program product of claim 17, wherein the step of determining the strongest correlation peaks includes determining a predetermined number of strongest correlation peaks.

* * * * *